United States Patent

Fischer et al.

[11] Patent Number: 6,066,693
[45] Date of Patent: May 23, 2000

[54] POLYMER COMPOSITION FOR GRAFT COPOLYMERS AS WELL AS MIXTURES THEREOF AND THERMOPLASTIC COMPOUNDS CONTAINING THEM

[75] Inventors: Michael Fischer, Ludwigshafen; Bernhard Rosenau, Neustadt; Wolfgang Fischer, Ludwigshafen, all of Germany

[73] Assignee: BASF Aktiengesellschaft, Ludwigshafen, Germany

[21] Appl. No.: 08/981,521

[22] PCT Filed: Jun. 26, 1996

[86] PCT No.: PCT/EP96/02792

§ 371 Date: Dec. 23, 1997

§ 102(e) Date: Dec. 23, 1997

[87] PCT Pub. No.: WO97/01589

PCT Pub. Date: Jan. 16, 1997

[30] Foreign Application Priority Data

Jun. 26, 1995 [DE] Germany ............... 195 23 080
Mar. 20, 1996 [DE] Germany ............... 196 10 896

[51] Int. Cl.[7] ............... C08L 51/00; C08F 265/04; C08F 291/02; C08F 285/00
[52] U.S. Cl. ............... 525/67; 525/64; 525/143; 525/316; 525/302
[58] Field of Search ............... 525/67, 64, 143, 525/316, 902

[56] References Cited

U.S. PATENT DOCUMENTS

| | | | |
|---|---|---|---|
| 4,634,734 | 1/1987 | Hambrecht et al. | 525/85 |
| 4,788,253 | 11/1988 | Hambrecht et al. | 525/83 |
| 5,196,480 | 3/1993 | Seitz et al. | 525/71 |
| 5,276,092 | 1/1994 | Kempner et al. | 524/64 |

FOREIGN PATENT DOCUMENTS 258 741  3/1988  European Pat. Off. .
390 144  10/1990  European Pat. Off. .

*Primary Examiner*—James J. Seidleck
*Assistant Examiner*—O. Asinovsky
*Attorney, Agent, or Firm*—Keil & Weinkauf

[57] ABSTRACT

Graft copolymers (P1) having an average particle size of from 40 to 2000 nm contain at least (P1.1) a soft segment having a glass transition temperature of not more than 10° C. as a grafting base, which segment contains at least one acrylate as the monomer or as one of two or more monomers copolymerizable with one another, and at least one crosslinking agent, and (P1.2) a hard segment having a glass transition temperature of at least 11° C. as a graft layer, which segment contains at least one vinylaromatic monomer as one of two or more monomers copolymerizable with one another, that region of the subsequent graft layer which is adjacent to the grafting base P1.1 comprising at least one vinylaromatic monomer and the region facing away from the grafting base comprising at least one vinylaromatic monomer with at least one monomer copolymerizable therewith, and blends and thermoplastic materials contain these graft copolymers.

28 Claims, No Drawings

POLYMER COMPOSITION FOR GRAFT COPOLYMERS AS WELL AS MIXTURES THEREOF AND THERMOPLASTIC COMPOUNDS CONTAINING THEM

The present invention relates to graft copolymers (P1) having an average particle size of from 40 to 2000 nm and containing at least P1. 1) a soft segment having a glass transition temperature of not more than 10° C. as a grafting base, which segment contains at least one acrylate as the monomer or as one of two or more monomers copolymerizable with one another, and at least one crosslinking agent (P1.1) and P1.2) a hard segment having a glass transition temperature of at least 11C as a graft layer, which segment contains at least one vinylaromatic monomer as one of two or more monomers copolymerizable with one another, that region of the subsequent graft layer which is adjacent to the grafting base P1.1 comprising at least one vinylaromatic monomer and that region facing away from the grafting base comprising at least one vinylaromatic monomer with at least one monomer copolymerizable therewith (P1.2).

The present invention furthermore relates to a process for the preparation of these segments and to the use thereof for the preparation of graft copolymers, processes for the preparation of these graft copolymers, the use thereof in blends, blends containing graft copolymers, processes for the preparation of these blends and the use of these graft copolymers and blends for the preparation of thermoplastic materials and these thermoplastic materials. Preferred embodiments are described in both the subclaims and the description. The present invention furthermore relates to moldings, films, fibers and coatings which contain or use the novel graft copolymers, blends and materials.

Graft copolymers, which are frequently also referred to as core-shell particles, are known, for example, as impact modifiers for plastics, such as styrene/acrylonitrile copolymers, polyvinyl chloride (PVC), polymethyl methacrylate or polycarbonate. They may be composed of two or more stages. The grafting base, the core, may consist of an elastomeric soft segment, ie. one having a glass transition temperature of less than about 25° C., for example less than 0° C., or a nonelastomeric, hard segment, ie. one having a glass transition temperature of more than about 25° C., for example more than 50° C. The graft layer or shell, can accordingly be hard or soft, respectively, while, in the case of multistage graft copolymers, alternately hard or soft and soft or hard, respectively.

The glass transition temperature of the individual stages can be influenced in each case by the choice of the monomers and also by the addition of one or more crosslinking agents. For example, compounds or monomers which have two or more functional groups which are capable of reacting with the monomers forming the grafting base or graft layer have crosslinking activity. If all functional groups of the polyfunctional monomer react at the same rate, these monomers have only a crosslinking effect. If, however, the crosslinking agents contain functional groups of different reactivity, the functional groups which have not reacted may serve as grafting points, for example for binding a graft layer to the grafting base. Such crosslinking agents therefore have not only cross-linking activity but also graft-linking activity.

The purposes for which graft copolymers may be used, for example the manner in which they influence optical quality, colorability, stability to weathering or cracking under impact and stress crack corrosion in molding materials, depend on their composition as well as on their size and morphology.

EP 450 485 discloses graft copolymers of thermoplastic materials having grafting bases comprising elastomeric crosslinked acrylate polymers, the grafting bases having average particle sizes of from 50 to 150 nm or from 200 to 700 nm, with graft shells which contain a vinylaromatic monomer, and further graft shells comprising styrene-containing copolymers. These are inferior to the novel thermoplastic materials, graft copolymer blends and graft copolymers, in particular with respect to the temperature-independence of the mechanical properties without deterioration of other properties, for example the colorability, and with respect to the defined core-shell morphology.

In order to obtain thermoplastic materials having good impact strength, graft rubbers are added to the matrix-forming polymers which are brittle at room temperature. The preparation of such impact modifiers has long been known and is described, for example, in DE-A-12 60 135, DE-A-23 11 129 and DE-A-28 26 925. If the matrix consists of polystyrene or styrene copolymers, it is found that the efficiency of the graft copolymers with respect to their toughening activity increases with increasing size of the graft copolymers. When small-particled graft rubbers are used, there is simultaneously the problem that the toughness of the toughening materials depends to a great extent on the processing temperature.

Materials having improved or temperature-independent mechanical properties, preferably impact strength with constant good other properties, for example colorability, can be obtained by mixing a large-particled rubber component with a small-particled one (bimodal rubber particles), as described in DE-A-28 26 925. Often, the resulting impact strength, in particular the low temperature impact strength, of the materials is insufficient for high stress. Moreover, the impact strength cannot be increased by adding any desired amount of the large-particled rubber, since otherwise the colorability is substantially impaired.

It is an object of the present invention to provide plastics, in particular thermoplastic materials, which have better mechanical properties, for example impact strength and stress crack corrosion and in particular better multiaxial impact strengths, especially at low temperatures, for example below 0° C., preferably independently of the processing temperature, and can be equally well or more readily colored and have more resistant surfaces whose gloss or dullness remains constant or can be improved.

In this context, it is a further object of the invention to provide graft copolymers in which the particle size and preferably a defined phase transition can be established, the establishment of small particles (<150 nm) and large particles (≧150 nm) with defined phase transitions being particularly important, and these graft copolymers should also influence the mechanical properties of the thermoplastic materials in the manner described above.

It is a further object of the present invention to provide blends of graft copolymers which contain the abovementioned graft copolymers, and blends preferably comprising small-particled and large-particled graft copolymers are preferably to be provided, and these blends should also influence the mechanical properties of the thermoplastic materials in the manner described above.

It is a further object of the present invention to provide products which are resistant to weathering and are based on acrylonitrile/styrene/acrylate to (ASA) polymers, in particular those having a polystyrene-co-acrylonitrile matrix, which, in addition to the advantageous properties of the known materials, such as resistance to weathering and to aging, have very good toughness in combination with good colorability and independence of the toughness of the processing temperature.

It is a further preferred object of the present invention to generate temperature-independent mechanical properties in combination with constant or better other properties, in particular colorability, by means of the particle size, in particular by means of small-particled graft copolymers which are used alone or as mixtures with further graft copolymers in thermoplastic materials.

We have found, surprisingly, that these objects are achieved by the graft copolymers defined at the outset and the graft copolymer blends containing them and by thermoplastic materials containing the graft copolymers and/or blends.

The graft copolymers are denoted by P. The number following P numbers the graft copolymers serially. The number following this denotes the segments which the graft copolymer contains. In the case of preferred novel graft copolymers in which the order of the successive segments is not free but fixed, the number 1 denotes the grafting base and the numbers 2, 3, etc. denote the graft layers following the grafting base, in their sequence. The third number following P denotes the monomers, crosslinking agents or crosslinker components contained by the segment.

The novel blends are denoted by M. The number following M numbers the blends serially. The Roman numeral following M in second place and appearing in upper case letters denotes the graft copolymers which lo the blend contains.

T denotes the novel thermoplastic materials. The number following T numbers the thermoplastic materials serially. The Roman numerals written in lower case letters denote the components contained by the materials.

A novel graft copolymer P1 preferably contains a soft segment (P1.1) having a glass transition temperature of not more than 10° C., preferably not more than 0° C., particularly preferably not more than −20° C., in an amount of from 30 to 90, preferably from 35 to 80, particularly preferably from 40 to 75, % by weight, based on the sum of the percentages by weight of the segments P1.1 and P1.2.

Furthermore, the graft copolymer P1 preferably has a hard segment (P1.2) having a glass transition temperature of at least 11° C., preferably at least 25° C., particularly preferably at least 60° C., in an amount of from 10 to 70, preferably from 20 to 65, particularly preferably from 35 to 60, % by weight, based on the sum of the percentages by weight of the segments P1.1 and P1.2. The hard segment P1.2 preferably contains a vinylaromatic monomer as the monomer or as one of two or more monomers copolymerizable with one another.

A further novel graft copolymer (P2) contains a soft segment (P2. 1), preferably in an amount of from 30 to 90, especially from 35 to 80, particularly preferably from 40 to 75, % by weight, and a hard segment (P2.2), preferably in an amount of from 5 to 50, especially from 5 to 35, particularly preferably from 5 to 30, % by weight, and a further hard segment (P2.3), preferably in an amount of from 5 to 50, especially from 15 to 45, particularly preferably from 20 to 40, % by weight. The sum of the percentages by weight of the segments P2.1 to P2.3 is 100.

According to the invention, the segments P1.1 and P2.1 preferably form a core-like grafting base. The segments P1.2, and P2.2 and P2.3, form graft layers following the abovementioned grafting bases, the segment P2.3 in turn following, as a graft layer, the segment P2.2 forming the first graft layer after the core.

The segments P1.1 and P2.1 consist of an elastomeric material and preferably have a glass transition temperature of not more than 0° C., preferably not more than −20° C. The rubber material used is preferably a crosslinked acrylate or acrylic ester polymer having a glass transition temperature of 0° C., preferably less than −20° C. However, other suitable rubber materials are crosslinked polydienes, such as polybutadiene, or crosslinked silicone rubbers, such as polydimethoxysiloxane. The novel grafting bases P1.1 and P1.2 are preferably free of monomers, crosslinking agents and polymers which form the subsequent graft layer(s) and are used for the preparation thereof.

The composition of the segments P1.1 and P2.1 will now be described by way of example with reference to the composition of P1.1, and, in accordance with the method of designation defined at the outset, the same applies to the segment P2.1.

The segment P1.1 is preferably composed of

P1.1.1 from 50 to 99.9, preferably from 55 to 99, particularly preferably from 60 to 99, % by weight of at least one alkyl acrylate, diene or alkylsiloxane, P1.1.2 from 0.1 to 10, preferably from 0.5 to 5, particularly preferably from 1 to 3, % by weight of at least one crosslinking agent and P1.1.3 from 0 to 49, preferably from 0 to 45, particularly preferably from 0 to 40, % by weight of a further monomer copolymerizable with the monomer P1.1.1.

Suitable acrylates, preferably of not more than 20 carbon atoms, or monomers P1.1.1 are alkyl acrylates, in particular acrylates where the alkyl radical is of 1 to 8, in particular 2 to 8, carbon atoms. n-Butyl acrylate and ethylhexyl acrylate are particularly suitable. Either one acrylate or a plurality of different acrylates may be used.

Preferably used crosslinking agents P1.1.2 are compounds having two or more functional groups, preferably those compounds which contain at least two ethylenic double bonds capable of copolymerization.

Further novel crosslinking agents P1.1.2 may be compounds having two or more functional groups of the same or different reactivity.

Compounds having two or more functional groups of the same reactivity are, for example, di- and trivinylbenzene, butanediol diacrylate, mono-, di-, tri- and tetraalkylene glycol diacrylates, preferably C1–$C_4$-monoalkylene glycol diacrylates, such as ethylene glycol diacrylate, n-propylene glycol diacrylate, n-butylene glycol 1,3-diacrylate and n-butylene glycol 1,4-diacrylate. Mono-, di-, tri- and tetraalkylene glycol dimethacrylates are also suitable, preferably Cl-$C_4$-monoalkylene glycol dimethacrylates, such as ethylene glycol dimethacrylate, n-propylene glycol dimethacrylate, n-butylene glycol 1,3-dimethacrylate and n-butylene glycol 1,4-dimethacrylate. Acrylates or methacrylates of glycerol, trimethylolpropane, pentaerythritol, inositol or similar sugar alcohols are also suitable crosslinking agents P1.1.2. Examples of further suitable crosslinking agents P1.1.2 are acrylamides or methacrylamides of ethylenediamine and other aliphatic diamines and polyamines. Diallyl maleate, diallyl fumarate or diallyl phthalate, triacylamides or trimethacrylamides, triallyl cyanurate or triallyl isocyanurate and trivinylbenzene may also be used as crosslinking agents P1.1.2.

Novel crosslinking agents having two or more functional groups of different reactivity, which are also referred to as graft-linking comonomers or graft linkers, are dihydrodicyclopentadienyl acrylate (DCPA), which is particularly preferably used as the crosslinking agent. DCPA can be used either alone or together with crosslinking agents having two or more functional groups of the same or different reactivity. Suitable crosslinking agents which have functional groups of the same reactivity and may be used with DCPA are the abovementioned ones.

Further crosslinking agents having functional groups of different reactivity, which may be used alone, in mixtures or, preferably, with DCPA, are ethylenically unsaturated monomers which carry epoxy, hydroxyl, carboxyl, amino or acid anhydride groups. These include hydroxyalkyl acrylates and hydroxyalkyl methacrylates, such as hydroxy-$C_1$–$C_{10}$-alkyl acrylates or hydroxy-$C_1$–$C_{10}$-alkyl methacrylates, in particular hydroxyethyl acrylate or hydroxy-n-propyl acrylate. Allyl methacrylate, methallyl methacrylate, acryloylalkoxysilanes or methacryloylalkoxysilanes of the formula I

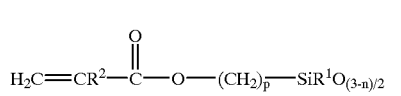

(I)

where $R^1$ is $C_1$–$C_3$-alkyl or phenyl, preferably methyl, $R^2$ is hydrogen or methyl, n is an integer from 0 to 2 and p is an integer from 1 to 6, preferably from 1 to 4, are preferred. Preferred examples are:

β-Methacryloyloxyethyldimethoxymethylsilane,
γ-methacryloyloxy-n-propylmethoxydimnethylsilane,
γ-methacryloyloxy-n-propylmethoxymethylsilane,
γ-methacryloyloxy-n-propyltrimethoxysilane,
γ-methacryloyloxy-n-propyldimethoxymethylsilane,
γ-methacryloyloxy-n-propyldiethoxymethylsilane and
δ-methacryloyloxy-n-butyldiethoxymethylsilane.

The preferred mixtures of crosslinking agents having two or more functional groups of different reactivity preferably include dihydrodicyclopentadienyl acrylate and hydroxyethyl acrylate; dihydrodicyclopentadienyl acrylate and allyl methacrylate; dihydrodicyclopentadienyl acrylate, hydroxyethyl acrylate and allyl methacarylate; dihydrodicyclopentadienyl acrylate, allyl methacrylate and β-methacryloyloxyethyldimethoxymethylsilane; dihydrodicyclopentadiienyl acrylate and β-methacryloyloxyethyldimethoxymethylsilane.

The choice of the crosslinking agents depends on the intended form of the network of the segment. A compact network results, for example, if one of the above crosslinking agents having two or more functional groups of different reactivity, preferably DCPA, is used with divinylbenzene, whereas a relatively loose network is obtained if, for example, a crosslinnking agent having two or more functional groups of different reactivity, preferably DCPA, is used with tetraethylene glycol diacrylate or dimethacrylate.

The particularly preferred crosslinker mixtures include dihydrodicyclopentadienyl acrylate and butanediol diacrylate; dihydrodicyclopentadienyl acrylate and divinylbenzene; dihydrodicyclopentadienyl acrylate and ethylene glycol diacrylate; and dihydrodicyclopentadienyl acrylate and tetraethylene glycol dimethacrylate. Further preferred crosslinker mixtures are dihydrodicyclopentadienyl acrylate, butanediol diacrylate and allyl methacrylate; dihydrodicyclopentadienyl acrylate, butanediol diacrylate and hydroxyethyl acrylate; dihydrodicyclopentadienyl acrylate, butanediol diacrylate and divinylbenzene; dihydrodicyclopentadienyl acrylate, hydroxyethyl acrylate and divinylbenzene or diethylene glycol diacrylate or tetraethylene glycol dimethacrylate; dihydrodicyclopentadienyl acrylate, hydroxyethyl acrylate, allyl methacrylate and divinylbenzene or diethylene glycol diacrylate or tetraethylene glycol dimethacrylate; dihydrodicyclopentadienyl acrylate, allyl methacrylate, ,- methacryloyloxyethyldimethoxymethylsilane and divinylbenzene or diethylene glycol diacrylate or tetraethylene glycol dimethacrylate; dihydrodicyclopentadienyl acrylate, β-methacryloyloxyethyldimethoxymethylsilane and divinylbenzene or diethylene glycol diacrylate or tetraethylene glycol dimethacrylate.

Examples of preferred monomers P1.1.3, which are preferably of not more than 20 carbon atoms, are hydroxyalkyl acrylates, (meth)acrylic acid, methyl methacrylate, phenoxyethyl acrylate, isoprene, butadiene, styrene, acrylonitrile, methacrylonitrile and vinyl alkyl ethers where the alkyl radical is of 1 to 8 carbon atoms, for example vinyl methyl ether, vinyl ethyl ether or vinyl propyl ether. Particularly preferred monomers P1.1.3 are butadiene and styrene. The abovementioned monomers P1.1.3 may be used either alone or as a mixture.

The hard segments P1.2 and P2.2 are described below with reference to the hard segment P1.2, the statements also applying to the hard segment P2.2, in accordance with the method of designation described at the outset.

The hard segment P1.2 is preferably composed of

P1.2.1) from 50 to 99.9, preferably from 65 to 100, % by weight of at least one vinylaromatic monomer,
P1.2.2) from 0 to 20, preferably from 0 to 5, % by weight of at least one crosslinking agent and
P1.2.3) from 0.1 to 50, preferably from 0 to 35, % by weight of at least one monomer copolymerizable with P1.2.1.

Novel monomers P1.2.1 are vinylaromatic monomers of, preferably, not more than 20 carbon atoms, for example styrene, α-methylstyrene or styrenes alkylated on the nucleus, such as p-methylstyrene or p-tert-butylstyrene, styrene, α-methylstyrene or p-methylstyrene or mixtures thereof being preferably used and styrene being particularly preferably used. Suitable crosslinking agents P1.2.2 are the crosslinking agents and crosslinker combinations described under P1.1.2 and the compounds described there as being preferred. Monomers P1.2.3, preferably not vinylaromatic monomers but acrylates and/or methacrylates of, preferably, not more than 20 carbon atoms, are, for example, acrylonitrile, methacrylonitrile, acrylic acid, methacrylic acid, methyl methacrylate, glycidyl methacrylate, maleic anhydride, tert-butyl acrylate or vinyl methyl ether and mixtures thereof. Monomers P1.2.3 preferred according to the invention and of not more than 10 carbon atoms are acrylates and/or methacrylates, for example acrylonitrile and methyl methacrylate.

According to the invention, it is preferable if the graft layer P1.2 following the grafting base P1.1 is a hard segment having at least two, three, four or five, preferably two, three or four, particularly preferably two, regions, that region of the subsequent grafting base which is adjacent to the grafting base P1.1 comprising at least one vinylaromatic monomer and the region facing away from the grafting base comprising at least one vinylaromatic monomer and, if required, at least one monomer copolymerizable therewith.

It is particularly preferable according to the invention if that region of the subsequent graft layer P1.2 which is adjacent to the grafting base comprises from 20 to 70, preferably from 10 to 50, especially from 10 to 40, particularly preferably from 15 to 30, % by weight of at least one vinylaromatic monomer P1.2.1 and the region facing away from the grafting base comprises from 30 to 80, preferably from 50 to 90, especially from 60 to 90, particularly preferably from 65 to 85, % by weight of at least one vinylaromatic monomer P1.2.1 and, if required, at least one monomer P1.2.3 copolymerizable therewith, in a ratio of P1.2.1 to P1.2.3 of from 95:5 to 60:40, preferably from 80:20 to 70:30, the sum of the percentages by weight of P1.2.1 and of P1.2.1 with, if required, P1.2.3 being 100.

The graft layers P1.2 and the regions forming the graft layers may have a diameter of from 1 to 1000 nm, preferably from 2 to 500 nm, especially from 3 to 200 nm, particularly preferably from 5 to 50 nm.

The diameter of the graft layers is obtained in the case of essentially spherical core-shell particles, for example, by subtracting the average particle size of the grafting base from the total size of the particle consisting of a grafting base and a graft layer and dividing this value by 2.

The addition of P1.2.1 with P1.2.3 can preferably begin after the addition of ⅙, preferably ⅓, particularly preferably ½, especially ¾, of the amount of P1.2.1 to be used first is complete. According to the invention, it may also be advantageous to begin the addition of P1.2.1 and P1.2.3 after the end of the addition of the amount of P1.2.1 used first. Furthermore, crosslinking agent P1.2.2 may be present during the addition of P1.2.1 and/or during that of P1.2.1 with P1.2.3.

The rate of addition of P1.2.1 or P1.2.1 with P1.2.3 and, if required, P1.2.2 may be varied over the duration of the addition; however, it preferably remains constant.

While the novel graft copolymer P1 preferably consists of a soft segment P1.1 as the grafting base and a hard segment P1.2 as a graft layer, the novel polymer P2 is preferably composed of a soft segment P2.1 as the grafting base and a hard segment P2.2 as the first graft layer and a further hard segment P2.3 as the second graft layer, the composition of P2.1 and P2.2 being identical to that of P1.1 and P1.2.

The hard segment P2.3 preferably forming the second graft layer consists of a material having a glass transition temperature of, preferably, at least 25° C., particularly preferably at least 80° C. The hard segment P2.3 is preferably composed of P2.3.1) from I to 99, preferably from 60 to 90, % by weight of at least one vinylaromatic monomer and P2.3.2) from 1 to 99, preferably from 10 to 40, % by weight of at least one monomer which is copolymerizable with P2.3.1 and which is preferably an ethylenically unsaturated monomer.

In contrast to the hard segments P1.2 and P2.2 which form the first graft layers and may or may not contain crosslinking agents, the hard segment P2.3 forming the second graft layer preferably has no crosslinking agent.

With regard to the vinylaromatic monomer P2.3.1, the above statements made in connection with P1.2.1 are applicable. Furthermore, the statements made in connection with P1.2.3 are applicable to P2.3.2.

In one embodiment, the small-particled grafting bases consisting of the soft segments P1.1 and P2.1 and present in the graft copolymers P1 and P2, respectively, preferably have an average particle size ($d_{50}$) of up to 150 nm, especially from 40 to 120 nm, particularly preferably from 50 to 100 nm.

In a further embodiment, large-particled grafting bases comprising the soft segments P1.2 and P2.1 of the corresponding graft copolymers P1 and P2 may, however, also preferably have an average particle size ($d_{50}$) of from 100 to 2000 nm, especially from 350 to 1000 nm, particularly preferably from 400 to 550 nm.

Further novel graft copolymers P1 and P2 may preferably have an average particle size ($d_{50}$) of from 40 to 2000 nm, especially from 50 to 1000 nm, particularly preferably from 60 to 800 nm.

The small-particled graft copolymers P1 and P2 can, independently of one another, preferably have an average particle size ($d_{50}$) of from 40 to 200 nm, especially from 80 to 180 nm, particularly preferably from 80 to 120 nm.

Furthermore, the novel large-particled graft copolymers P1 and P2 may also preferably have an average particle size ($d_{50}$) of from 250 to 2000 nm, especially from 350 to 1000 nm, particularly preferably from 400 to 800 nm.

In all cases, the stated average particle size is the weight average particle size as determined by means of an analytical ultracentrifuge according to the method of W. Scholtan and H. Lange, Kolloid-Z. und Z.-Polymere 250 (1972), 782–796. The ultracentrifuge measurements give the integral mass distribution of the particle diameter of a sample. From this it is possible to calculate the percentage by weight of the particles which have a diameter equal to or smaller than a certain size. The average particle diameter, which is also referred to as the $d_{50}$ value of the integral mass distribution, is defined as the particle diameter at which 50% by weight of the particles have a smaller diameter than the diameter which corresponds to the $d_{50}$ value. Furthermore, 50% by weight of the particles then have a larger diameter than the $d_{50}$ value.

The novel graft copolymers P1 and P2 can preferably be prepared by known methods (cf. inter alia German Patent 1,260,135, DE 23 11 129, DE 28 26 925, EP 81 76, EP 450 485, U.S. Pat. No. 3,691,260).

In a process for the preparation of a graft copolymer P1, it is preferable if the monomers and crosslinking agents forming the soft segment P1.1 and the hard segment P1.2 are polymerized in the presence of emulsifiers at from 20 to 100° C., the polymerization of the grafting base P1.1 being begun before that of the graft layer P1.2 and, in the case of the graft layer P1.2, the addition of at least one vinylaromatic monomer being begun before the addition of at least one vinylaromatic monomer with at least one monomer copolymerizable therewith.

A process for the preparation of a graft copolymer P2 is preferably the same as the process for the preparation of P1, the polymerization of the grafting base P2.1 being begun before that of the graft layer P2.2 and, in the case of the graft layer P2.2, the addition of at least one vinylaromatic monomer being begun before the addition of at least one vinylaromatic monomer with at least one monomer copolymerizable therewith, and the polymerization of the graft layer P2.3 being begun after the start of the polymerization of the graft layer P2.2.

Preferably, the graft copolymers P1 and P2 are prepared by polymerizing the graft layer P1.2 and P2.2, respectively, in at least two stages onto the grafting base P1.1 and P1.2, respectively, from 20 to 70, preferably from 10 to 50, especially from 10 to 40, particularly preferably from 15 to 35, % by weight of P1.2.1 or P2.2.1 being used in a first stage and from 30 to 80, preferably from 50 to 90, especially from 60 to 90, particularly preferably from 65 to 85, % by weight of a mixture of the monomers P1.2.1 and P1.2.3, and P2.2.1 and P2.2.3, respectively, in a weight ratio of from 90:10 to 60:40, preferably from 80:20 to 70:30, being used in a second stage.

For this purpose, the soft segments forming the grafting bases P1.1 and P2.1 are first prepared. The soft segments can be prepared both in one step and in a plurality of steps, for example two, three, four, five or six, preferably two or three, particularly preferably two, steps. In one embodiment of the one-step synthesis of the soft segment, either a crosslinking agent having two or more functional groups of the same reactivity or a crosslinking agent having two or more functional groups of different reactivity is used. In a further embodiment, one or more crosslinking agents of the two generic types may be used in the one-step synthesis. It is also possible to prepare soft segments by a multistep synthesis.

If the synthesis is carried out in one step, the soft segment to generally has a uniform morphology. If the synthesis is carried out in a plurality of steps, the soft segment may have a morphology comprising different regions. In an embodiment, preferred according to the invention, of the multistep synthesis, a seed latex is first prepared from the monomers forming the soft segment, if required with crosslinking agents, said seed latex being reacted in at least one subsequent step with further monomers, and, if required, with further crosslinking agent to give the grafting base.

The acrylates (P1.1.1 or P2.1.1) and the crosslinking agent or agents (P1.1.2 or P2.1.2) and, if required, the monomers (P1.1.3 or P2.1.3) are polymerized in aqueous emulsion at from 20 to 100° C., preferably from 50 to 80° C., particularly preferably from 60 to 70° C., as grafting bases. The conventional emulsifiers, such as alkali metal salts of alkanesulfonic or alkylarylsulfonic acids, alkylsulfates, fatty alcohol sulfonates, salts of higher fatty acids of 10 to 30 carbon atoms or resin soaps, may be used. The potassium or sodium salts of alkanesulfonates or of fatty acids of 10 to 18 carbon atoms are preferably used. It is advantageous to use the emulsifiers in an amount of from 0.1 to 5, preferably from 0.2 to 2, particularly preferably from 0.3 to 1, % by weight, based on the total weight of the monomers and crosslinking agents used for the preparation of the grafting base. In general, a water/monomer ratio of from 2:1 to 0.7:1 is used. The polymerization initiators used are in particular the conventional persulfates, for example potassium peroxodisulfate; however, redox systems are also suitable. The amount of initiators, for example in 0.1 to 25% by weight, based on the total weight of the monomers, depends in a generally known manner on the desired molecular weight.

The polymerization assistants used may be the conventional buffer substances which are known to a person skilled in the art and by means of which the pH is brought to, preferably, 6–9, especially 6.5–8, particularly preferably 6.9–7.3, for example sodium bicarbonate and sodium pyrophosphate, and up to 3, preferably up to 2, % by weight of a molecular weight regulator, for example mercaptans, terpinol or dimeric α-methylstyrene.

The exact polymerization conditions, in particular the type, metering and amount of the emulsifier, are chosen within the abovementioned ranges so that the resulting latex of the novel soft segments P1.1 and P1.2 has an average particle size ($d_{50}$) in the desired range. The large-particled graft copolymers P1 and P2 are preferably obtained here by using lattices.

For the preparation of the hard segments P1.2 and P2.2, each of which forms the first graft layer in the novel graft copolymers P1 and P2, at least one vinylaromatic monomer (P1.2.1 or P2.2.1) is first polymerized in the presence of the latex of the soft segments P1.1 and P2.1, respectively, forming the grafting bases. The grafting-on of the soft segments forming the first graft layers can preferably be effected in the same system in which the emulsion polymerization for the preparation of the grafting bases was carried out. However, it may also be preferable to add further emulsifier and initiator during the grafting-on of the first graft layer. The monomers forming the first graft layer and any crosslinking agents also used may be added to the reaction mixture independently of one another, all at once, batchwise in a plurality of stages or, preferably, continuously during polymerization. The polymerization of the monomers forming the first graft layer, preferably styrene, and any crosslinking agent or agents present is carried out in such a way that the degree of grafting, defined as the weight ratio of P1.2 to the sum of P1.1 and P1.2 or of P2.2 to the sum of P2.1 and P2.2, is from 5 to 45, preferably from 10 to 30, particularly preferably from 10 to 25, in the corresponding graft copolymers P1 and P2.

Another process preferred according to the invention for the preparation of graft layers P1.2 and P2.2 of the graft copolymers P1 and P2, respectively, is one in which the graft layer P1.2 or P2.2 is prepared in at least two or in three, four or five, but preferably in two, stages, from 20 to 70% by weight of a mixture of the monomers P1.2.1 and P2.2.1 and P1.2.2 and P2.2.2, in a weight ratio of from 95:5 to 60:40, preferably from 80:20 to 70:30, being used in the first stage.

In a further stage, a further hard segment P2.3 is grafted onto the graft copolymer consisting of a grafting base comprising a soft segment P2.1 and a hard segment P2.2, by adding to said copolymer a monomer mixture comprising at least one vinylaromatic monomer P2.3.1 and at least one preferably ethylenically unsaturated monomer P2.3.2 copolymerizable therewith, in a ratio of P2.3.1 to P2.3.2 of, preferably, from 90:10 to 60:40, especially from 80:20 to 65:35. Preferably, the preparation of the second graft layer is advantageously carried out in the same system in which the graft layer P2.2 was grafted onto the graft layer P2.1. It may be advantageous here to add further emulsifier and initiator. In this polymerization, the emulsifiers and initiators used may preferably be the same as those used in the preceding polymerization for grafting on the first graft layer. The choice of the possible emulsifiers and intiators and polymerization assistants, etc. corresponds to that mentioned for the preparation of the first graft layer. The monomer used for the preparation of the second graft layer, or the monomer mixtures, preferably comprising styrene and acrylonitrile, may be added to the reaction mixture, for example, all at once, batchwise in a plurality of stages or preferably continuously during the polymerization. The degree of grafting, defined as the percentage by weight of P2.3, based on the sum of the percentages by weight of P2.1, P2.2 and P2.3, is established by carrying out the polymerization reaction in such a way that the resulting degree of grafting is preferably from 10 to 55, particularly preferably from 15 to 45, in the graft copolymer P2.

The graft copolymers P1 and P2 can be isolated, for example, by adding an electrolyte, for example a metal halide, preferably an alkaline earth metal or alkali metal halide, particularly preferably an alkaline earth metal chloride, preferably as an aqueous solution, to the emulsion of from 50 to 100° C., preferably from 70 to 95° C., particularly preferably from 80 to 90° C., and if necessary drying said graft copolymer.

The novel graft copolymers P1 and P2 can be used both alone and as a mixture with other graft copolymers or copolymers. They are suitable as impact modifiers for thermoplastic materials. The novel graft copolymers P1 and P2 are particularly suitable as impact modifiers for thermoplastics which have a glass transition temperature of 25° C. or higher, preferably above 60° C., particularly preferably above 80° C. Examples of these are polyvinyl chloride (PVC), polymethyl methacrylate and copolymers of vinylaromatic monomers and polar, copolymerizable, ethylenically unsaturated monomers.

A novel embodiment of the blends of graft copolymers contains at least one small-particled graft copolymer P1 and/or P2 (Mk).

Another embodiment of a novel blend of the graft copolymers contains at least one large-particled graft copolymer P1 and/or P2 (Mg).

In addition to the novel graft copolymers P1 and P2, all graft copolymers known to a person skilled in the art, preferably those having a toughening effect, may be present. Particularly suitable graft copolymers for the novel blends are graft copolymers consisting of a grafting base and at least one graft layer, in which the grafting base is either soft or hard and the graft layers consist of soft and hard segments, respectively. By way of example, reference may be made in this context to the graft copolymers ii described below.

In a further preferred embodiment, the novel blend is bimodal. The novel small-particled graft copolymers P1 and P2 have a Q value of <0.9, preferably <0.5, particularly preferably from 0 to 0.35. The novel large-particled graft copolymers P1 and P2 have a Q value of <0.6, preferably <0.3, particularly preferably from 0 to 0.2. The Q value serves for characterizing the width of the particle size distribution of the graft copolymers. In addition to the $d_{50}$ value (average particle size), the $d_{10}$ and d90 values determined from the integral mass distribution are used for determining the Q value. Q corresponds to $(d_{10}-d_{10})/d_{50}$.

Novel blends (MI) contain at least two graft copolymers P1 which differ from one another at least in their average particle size. The blends M1 may preferably contain two, three, four or five graft copolymers P1 which differ from one another at least in their average particle size, blends comprising two different graft copolymers P1 being particularly preferred.

The blends M1 may also consist of graft copolymers P1 which differ not only in the average particle size but also in their monomer or crosslinking agent composition and in the type of phase transitions between the individual segments which form the grafting base or graft layer. Furthermore, the graft copolymers P1 used in the blends M1 may differ not only in the average particle size of the graft copolymers but also in the average particle size of the grafting base and by virtue of having different graft layer thicknesses.

The blends M1 particularly preferred according to the invention are those which each contain at least one of the abovementioned large-particled graft copolymers P1 with one of the abovementioned small-particled graft copolymers P1.

Novel blends (M2) contain at least two graft copolymers P2 which differ from one another at least in their average particle size. The blends M2 may preferably contain two, three, four or five graft copolymers P2 which differ from one another at least in the average particle size, blends comprising two different graft copolymers P2 being particularly preferred.

The blends M2 may also consist of graft copolymers P2 which differ not only in the average particle size but also in their monomer or crosslinking agent composition and in the type of phase transitions between the individual segments which form the grafting base or graft layer. Furthermore, the graft copolymers P2 used in the blends M2 may differ not only in the average particle size of the graft copolymers but also in the average particle size of the grafting base and by virtue of having different graft layer thicknesses.

Blends M2 particularly preferred according to the invention are those which each contain at least one of the abovementioned large-particled graft copolymers P2 with one of the abovementioned small-particled graft copolymers P2.

Novel blends M3 contain in each case at least one of the graft copolymers P1 and P2. Blends M3 preferred according to the invention contain one, two, three or four different graft copolymers P1 and one, two, three or four different graft copolymers P2. Preferred blends M1 contain one graft copolymer P1 and one graft copolymer P2. Novel blends M3 may contain at least one graft copolymer P1 having the abovementioned average particle sizes ($d_{50}$) for the graft copolymer P1 or for the grafting base P1.1 contained in the graft copolymer P1 and at least one graft copolymer P2 having the abovementioned average particle sizes (d50) for the graft copolymer P2 or for the grafting base P2.1.

An embodiment of the blend M3 contains at least one of the abovementioned small-particled graft copolymers P1 and at least one of the abovementioned large-particled graft copolymers P2.

A further embodiment of the blend M3 comprises at least one of the abovementioned graft copolymers P1 and at least one of the abovementioned small-particled graft copolymers P2.

Other embodiments of the blend M3 each comprise at least one of the abovementioned small-particled graft copolymers P1, P2.

Furthermore, one embodiment of the blend M3 contains at least one each of the abovementioned large-particled graft copolymers P1 and P2.

In the preparation process leading to the novel blends of graft copolymers, essentially the two graft copolymers are mixed with one another in a conventional extruder at from 200 to 300° C., preferably from 220 to 280° C., and in an average residence time of from 0.1 to 100, preferably from 0.5 to 5, particularly preferably from 0.5 to 3, minutes.

The novel graft copolymers P1 and P2 and/or the novel blends M1 to M3 may be used either alone or as a mixture with other graft copolymers or copolymers. They are suitable as impact modifiers for thermoplastic materials. The novel graft copolymers and/or blends are particularly suitable as impact modifiers for thermoplastics which have glass transition temperatures of at least 25° C., preferably at least 60° C., particularly preferably at least 80° C. Examples are polyvinyl chloride (PVC), polymethyl methacrylate and copolymers of vinylaromatic monomers and polar copolymerizable, ethylenically unsaturated monomers or mixtures thereof.

Particularly preferred copolymers are styrene/acrylonitrile copolymers and methylstyrene/acrylonitrile copolymers. In addition, the thermoplastic, likewise novel materials may contain other thermoplastics, in particular polycarbonates.

The preferred thermoplastic materials (T1) include those which contain
i) 0–95, preferably 5–95, % by weight of at least one of the graft copolymers P1 and P2 and/or at least one of the blends Mg and Mk, and M1 to M3,
ii) 0–90, preferably 5–90, % by weight of at least one graft copolymer and/or blend differing from i,
iii) 5–95, preferably 5–90, % by weight of at least one copolymer comprising
   iii.1) 50–100% by weight of at least one vinylaromatic monomer, $C_1$- to $C_{18}$-alkyl acrylate, $C_1$- to $C_{18}$-alkyl methacrylate or a mixture thereof and
   iii.2) 0–50% by weight of acrylonitrile, methacrylonitrile, maleic anhydride, an N-substituted maleimide or a mixture thereof, the sum of the percentages by weight of iii.1 and iii.2 being 100,
iv) 0–90% by weight of at least one polycarbonate and
v) 0–50% by weight of additives,
the sum of the percentages by weight of i to v being 100.

Thermoplastic materials particularly preferred according to the invention comprise at least one of the small-particled graft copolymers P1 and/or P2 and/or blends containing at least one small-particled graft copolymer P1 and/or P2.

In a further novel embodiment of the thermoplastic materials, at least one small-particled graft copolymer P1 or P2 is present.

In a preferred embodiment, thermoplastic materials contain 10–70% by weight of at least one graft copolymer P1 (component i.1), 10–70% by weight of at least one graft copolymer P2 (component i.2), 20–89.9% by weight of at least one copolymer iii and 0.1–20% by weight of additives.

Processing is carried out by extrusion, kneading or milling of all components i–v in a conventional apparatus, for example in an extruder, kneader, roll mill or milling apparatus, the components being processed in any sequence.

The graft copolymers P1 and P2 may be used in any desired combination or alone as materials. For this purpose, they may be worked up, for example by spray-drying.

Preferred graft copolymers ii are composed of a grafting base comprising a material having a glass transition temperature of at least 25° C., preferably at least 80° C., in particular 80–130° C., ie. a hard, non-resilient material. These graft copolymers ii contain two or more graft layers; preferably, they contain not more than three graft layers.

Preferred graft copolymers ii contain ii. 1) 50–90% by weight of a grafting base comprising a material having a glass transition temperature of at least 25° C., composed of
 ii.1.1) 50–99.9% by weight of at least one vinylaromatic monomer,
 ii.1.2) 0–49.9% by weight of at least one monomer copolymerizable with ii. 1.1 and
 ii.1.3) 0.1–10% by weight of at least one crosslinking agent and
ii.2) 4.9–90% by weight of a graft layer comprising a material having a glass transition temperature of not more than 0° C., composed of
 ii.2.1) 50–100% by weight of at least one $C_1$- to $C_{18}$-alkyl acrylate, diene or dialkylsiloxane,
 ii.2.2) 0–50% by weight of at least one monomer copolymerizable with the monomers ii.2.1 and
 ii.2.3) 0–20% by weight of at least one crosslinking agent and
ii.3) 0.1–85% by weight of a second graft layer comprising a material having a glass transition temperature of at least 25° C., composed of
 ii.3.1) 50–100% by weight of at least one vinylaromatic monomer,
 ii.3.2) 0–50% by weight of at least one monomer copolymerizable with the monomer ii.3.1 and
 ii.3.3) 0–20% by weight of at least one crosslinking agent and
ii.4) 5–90% by weight of a third graft layer comprising a material having a glass transition temperature of at least 25° C., composed of
 ii.4.1) 1–99% by weight of at least one vinylaromatic monomer and
 ii.4.2) 1–99% by weight of at least one monomer copolymerizable with the monomer ii.4.1), where the sums of the percentages by weight of the individual groups of components should each be 100.

Particularly preferred graft copolymers ii contain
5–20% by weight of ii.1,
40–65% by weight of ii.2,
10–25% by weight of ii.3 and
10–40% by weight of ii.4,
the sum of the components ii.1 to ii.4 being 100.

The grafting base ii.1 is preferably composed of 60–99.8, in particular 70–99.5, % by weight of ii.1.1, 0–39.8, in particular 0–29.5, % by weight of ii.1.2 and 0.1–10, in particular 0.5–3, % by weight of ii.1.3.

Preferred graft copolymers ii are composed of a grafting base comprising a material having a glass transition temperature of not more than 0° C., preferably not more than −10° C., in particular not more than −30° C., ie. a soft, resilient material. These graft copolymers ii contain two or more graft layers; preferably, they contain not more than three graft layers.

Further preferred graft copolymers ii contain ii.1) 4.9–94.9% by weight of a graft layer comprising a material having a glass transition temperature of not more than 0° C., composed of
 ii.1.1) 50–100% by weight of at least one $C_1$- to $C_{18}$-alkyl acrylate, diene or dialkylsiloxane,
 ii.1.2) 0–50% by weight of at least one monomer copolymerizable with the monomers ii.2.1 and
 ii.1.3) 0–20% by weight of at least one crosslinking agent and
ii.2) 0.1–85% by weight of a second graft layer comprising a material having a glass transition temperature of at least 25° C., composed of
 ii.2.1) 50–100% by weight of at least one vinylaromatic monomer,
 ii.2.2) 0–50% by weight of at least one monomer copolymerizable with the monomer ii.3.1 and
 ii.2.3) 0–20% by weight of at least one crosslinking agent and
ii.3) 5–90% by weight of a third graft layer comprising a material having a glass transition temperature of at least 25° C., composed of
 ii.3.1) 1–99% by weight of at least one vinylaromatic monomer and
 ii.3.2) 1–99% by weight of at least one monomer copolymerizable with the monomer ii.3.1), where the sum of the percentages by weight of the individual groups of components should each be 100.

Further particularly preferred graft copolymers ii contain
5–50% by weight of ii.1,
40–65% by weight of ii.2 and
10–30% by weight of ii.3,
the sum of the components ii.1 to ii.3 being 100.

Preferably, the grafting base ii.1 is composed of 60–99.8, in particular 70–99.5, % by weight of ii.1.1, 0–39.8, in particular 0–29.5, % by weight of ii.1.2 and 0.1–10, in particular 0.5–3, % by weight of ii.1.3.

For the choice of monomers and crosslinking agents and preparation process as well as average particle diameter, etc., the above statements made in connection with soft and hard segments having a similar composition are applicable. The graft copolymers ii may be prepared by methods known per se, so that reference may be made here, for example, to EP-A-450 485.

As a rule, materials which contain only the components i and ii form a bimodal particle mixture.

In addition to the components i and ii, the materials may contain, as component iii, one or more copolymers in amounts of preferably 5–95% by weight, based on the components i to v. Preferred molding materials contain 20–79.9, in particular 40–74.9, % by weight, based on the components i to v, of the component iii.

Preferred copolymers contain 60–80% by weight, based on the components iii.1 and iii.2, of monomers iii.1 and 20–40% by weight, based on the components iii.1 and iii.2, of monomers iii.2.

Preferred copolymers iii are those which comprise at least one monomer from the group consisting of styrene, a-methylstyrene, styrenes substituted on the nucleus, such as p-methylstyrene, and methyl methacrylate, copolymerized with at least one monomer from the group consisting of acrylonitrile, methacrylonitrile and maleic anhydride.

Particularly preferred copolymers iii are those comprising styrene, acrylonitrile and, if required, methyl methacrylate. Other particularly preferred copolymers iii contain α-methylstyrene, acrylonitrile and, if required, methyl methacrylate. In addition, copolymers iii comprising styrene, α-methylstyrene and acrylonitrile and, if required, methyl methacrylate are particularly preferred. Furthermore, copolymers of styrene and maleic anhydride are among the particularly preferred copolymers iii. The copolymers iii are as a rule resin-like, thermoplastic and rubber-free.

In a further embodiment, the thermoplastic materials and the components present therein, in particular the novel graft copolymers and blends thereof and the components ii and iii, are rubber-free, in particular free of diene rubber, particularly preferably free of butadiene and/or isoprene rubber, in order to comply with DIN 16777/2 and ISO6402/1.

The copolymers iii are known per se; those which are unknown can be prepared by methods known per se, for example free radical polymerization, in particular emulsion, suspension, solution or mass polymerization. They have in general viscosity numbers of 40–60, preferably 60–100, ml/g. This corresponds to weight average molecular weights Mw of from 50,000 to 250,000 g/mol. The copolymers iii may furthermore have a molecular weight of from 1500 to 50,000 g/mol. In addition, the copolymers iii may preferably be present as a blend of the low molecular weight copolymers iii alone, having a molecular weight of from 1500 to 50,000 g/mol, or as a mixture with the high molecular weight copolymers iii having a molecular weight of from 50,000 to 250,000 g/mol.

The copolymers iii are also frequently formed as byproducts in the graft copolymerization for the preparation of the novel graft copolymers P1 to P5, particularly when large amounts of monomers are grafted onto small amounts of grafting base.

The materials may contain 0–90, preferably 0–80, % by weight of at least one polycarbonate as component iv.

The polycarbonates iv are known per se and are described in the literature.

These polycarbonates can preferably be prepared by reacting carbonic acid derivatives, such as phosgene or diphenyl carbonate, with diphenols. It is in principle possible to use all diphenols, as stated, for example, in the monograph by H. Schnell, Chemistry and Physics of Polycarbonates, Interscience Publishers, 1964, and in U.S. Pat. No. 2,999,835 and DE-A-22 48 817.

Dihydroxybiphenyl, di(hydroxyphenyl)alkanes and di(hydroxyphenyl) ethers and mixtures thereof are particularly preferred diphenols.

Suitable diphenols are, for example, 1,3-dihydroxybenzene, 1,4-dihydroxybenzene, 2,6-dihydroxynaphthalene, di(4-hydroxyphenyl)methane, 1,1-di(4'-hydroxyphenyl)ethane, 2,2-di(4'-hydroxyphenyl)propane (bisphenol A), 2,2-di(3'-chloro-4'-hydroxyphenyl)propane, 2,2-di(3',5'-dichloro-4'-hydroxyphenyl)propane, 2,2-di(3',5'-dibromo-4'-hydroxyphenyl)propane, 2,2-di(3',5'-dimethyl-4'-hydroxyphenyl)propane, 2,4-di(4'-hydroxyphenyl)-2-methylbutane, di(4'-hydroxyphenyl)pentane, 1,1-di(4'-hydroxy-phenyl)cyclohexane, 4,4'-dihydroxydiphenyl sulfone, 4,4'-dihydroxydiphenyl sulfite and 4,4'-dihydroxydiphenyl ether.

A particularly preferred diphenol is bisphenol A or a mixture thereof with other diphenols. The amount of bisphenol A in such mixtures is in general 70–98% by weight.

Both homopolymers and copolymers of mixtures of different diphenols may be used. Block copolymers, such as diorganosiloxane-containing polycarbonates, may also be used.

The polycarbonates iv can be branched by incorporating small amounts, for example from 0.05 to 2 mol %, based on the sum of the diphenols used, of trifunctional compounds or compounds having a functionality of more than three, such as those having three or more phenolic OH groups.

Processes for the preparation of polycarbonates iv are known per se. Thus, the polycarbonates can be prepared, for example, in the heterogeneous phase, ie. by the phase boundary method, or in the homogeneous phase, ie. by the pyridine method. Processes for the preparation of polycarbonate are described, for example, in DE-A-22 48 817, 13 00 266, 14 95 739 and 33 34 782 and U.S. Pat. No. 2 999 835.

The relative viscosity of the polycarbonates iv is in general 1.2–1.5, preferably 1.28–1.4, dl/g, measured in 0.5% strength by weight solution in dichloromethane at 25° C.

The thermoplastic materials may contain additives as component v. The amount thereof is in general 0–50, preferably 0.1–20, % by weight, based on the total weight of the components i to v.

Examples of conventional additives are glass fibers, flameproofing agents, stabilizers and antioxidants, heat stabilizers and UV stabilizers, lubricants and mold release agents, dyes and pigments and plasticizers.

Glass fibers comprising E, A or C glass may be used. In general, the glass fibers are provided with a size and an adhesion promoter. The diameter of the glass fiber is in general from 6 to 20 μm. Both rovings and chopped glass fibers having a length of 1–10 mm, preferably 3–6 mm, may be incorporated.

Pigments and dyes are generally present in amounts of up to 6, preferably 0.5–5, in particular 0.5–3, % by weight, based on the components i to v.

The pigments for coloring thermoplastics are generally known, cf. for example R. Gachter and H. Müller, Taschenbuch der Kunststoffadditive, Carl Hanser Verlag, 1983, pages 494–510. A first preferred group of pigments comprises white pigments, for example zinc oxide, zinc sulfide, lead white ($2PbCO_3.Pb(OH)_2$), lithopone, antimony white and titanium dioxide. Among the two most commonly used crystal modifications (rutile and anatase types) of titanium dioxide, the rutile form is particularly used for imparting whiteness to the molding materials.

Black pigments which may be used are, for example, iron oxide black ($Fe_3O_4$), spinel black ($Cu(Cr,Fe)_2O_4$), manganese black (mixture of manganese dioxide, silica and iron oxide), cobalt black and antimony black and particularly preferably carbon black, which is generally used in the form of furnace black or gas black (in this context, see G. Benzing, Pigmente für Anstrichmittel, Expert-Verlag (1988), page 78 et seq.).

It is of course possible to use inorganic colored pigments, such as chrome oxide green, or organic colored pigments, such as azo pigments or phthalocyanines, for establishing certain hues. Such pigments are in general commercially available.

Antioxidants and heat stabilizers which may be added to the novel thermoplastic materials are, for example, halides of metals of group I of the Periodic Table, for example, sodium, potassium and lithium halides, if necessary in combination with copper(I) halides, for example chlorides, bromides or iodides. The halides, in particular of copper, may also contain electron-rich π ligands. Examples of such copper complexes are copper halide complexes with, for example, triphenylphosphine. Zinc fluoride or zinc chloride may also be used. Furthermore, sterically hindered phenols, hydroquinones, substituted members of this group, secondary aromatic amines, if necessary in combination with phosphorus-containing acids, for example salts thereof, and mixtures of these compounds may be used, preferably in concentrations of up to 1% by weight, based on the components i to v.

Examples of UV stabilizers are various substituted resorcinols, salicylates, benzotriazoles and benzophenones, which are used in general in amounts of up to 2% by weight, based on the components i to v.

Lubricants and mold release agents, which are added as a rule in amounts of up to 1% by weight, based on the thermoplastic material, are stearic acid, stearyl alcohol, alkyl stearates and stearamides as well as esters of pentaerythritol with long-chain fatty acids. Salts of calcium, of zinc or of aluminum with stearic acid and dialkyl ketones, for example distearyl ketone, may also be used.

Examples of plasticizers are dialkyl phthalates, for example dioctyl phthalate.

The thermoplastic materials may be prepared preferably by methods known per se, by mixing the components in a conventional mixing apparatus, for example an extruder, a Brabender mill or a Banbury mill, and then carrying out extrusion. After the extrusion, the extrudate is cooled and comminuted. The thermoplastic materials have high impact strength, in particular at low temperatures. At the same time, the thermoplastic materials have high resistance to weathering and to aging.

Moreover, they can be readily colored. In the case of thermoplastic materials comprising novel small-particled graft copolymers which preferably have an average particle size ($d_{50}$) of not more than 200 nm, in particular the mechanical properties are independent of the processing temperature, the further properties, in particular the colorability, preferably being constant or better.

They can be processed to give moldings, films, coatings or fibers. They can also be applied, for example by means of known coextrusion methods, in the form of layers (preferably having layer thicknesses of from 100 µm to 10 mm) to surfaces, preferably thermoplastics, such as styrene/acrylonitrile copolymers, acrylonitrile/butadiene/styrene terpolymers (ABS), methyl methacrylate/butadiene/styrene (MABS), polystyrene, high impact polystyrene (HIPS) or PVC. The materials can be used, for example, in the automotive sector, in the household sector and for leisure articles. Thus, they can be processed, for example, to automotive parts, road signs, window profiles, lamp coverings, garden furniture, boats, surfboards or toys.

An embodiment, preferred according to the invention, of the graft copolymer P1 has an average particle size ($d_{50}$) of from 40 to 200 nm, preferably from 50 to 150 nm and consists of P1. 1) from 30 to 90, preferably from 35 to 80, particularly preferably from 45 to 75, % by weight of a grafting base having a glass transition temperature of not more than 0° C., which in turn comprises P1.1.1) from 50 to 99.9, preferably 55 to 99, in particular 60 to 99, % by weight of at least one alkyl acrylate, P1.1.2) from 0.1 to 10% by weight of at least one crosslinking agent and P1.1.3) from 0 to 49, preferably 0 to 45, particularly preferably 0 to 40, % by weight of at least one further monomer copolymerizable with P1.1 and P1.2) from 10 to 70, preferably from 20 to 65, particularly preferably from 35 to 60, % by weight of a graft layer grafted onto the grafting base P1.1 and having a glass transition temperature of at least 25° C., consisting of a vinylaromatic monomer P1.2.1 and a monomer P1.2.2 copolymerizable therewith, the graft layer P1.2 being synthesized in two stages by polymerizing from 20 to 70% by weight of the monomers P1.2.1 in a first stage and from 30 to 80% by weight of a mixture of the monomers P1.2.1 and P1.2.2 in a weight ratio of from 90:10 to 60:40 in a second stage.

A further novel embodiment of the graft copolymer P2 is present if a further graft layer (P2.3) which comprises at least one vinylaromatic monomer (P2.3.1) and at least one monomer (P2.3.2) polymerizable therewith is applied to the abovementioned embodiment.

EXAMPLES

Testing of performance characteristics

The weight average particle sizes ($d_{50}$) were determined by means of an analytical ultracentrifuge according to the method described by W. Scholtan and H. Lange, Kolloid-Z. und Z.-Polymere 250 (1972), 782–796.

The ultracentrifuge measurement gives the integral mass distribution of the particle diameter of a sample. From this it is possible to determine the percentage by weight of the particles which have a diameter equal to or smaller than a certain size. The average particle diameter, which is also referred to as the $d_{50}$ value of the integral mass distribution, is defined as the value at which 50% by weight of the particles have a smaller diameter, and 50% by weight of the particles a larger diameter, than the $d_{50}$ value.

The notched impact strengths ($a_k[kJ/m^2]$) were measured at the stated temperatures according to ISO179/1eA, using standard small bars injection molded and then milled (A notch).

The impact strengths ($a_n[kJ/m^2]$) were measured according to ISO179/1eU, using injection molded standard small bars.

In each case, two sample series which had been produced at different processing temperatures were investigated. The mean value from the testing of 10 samples per sample series is stated in each case.

The viscosity numbers (VN [$cm^3/g$]) were determined in each case in a 0.5% strength by weight solution in dimethylformamide at 23° C. Insoluble gel fractions were removed before the measurement by centrifuging, and the sample weight was corrected accordingly.

ΔE is a measure of the colorability and was determined according to DIN6174. The ΔE value is calculated from the difference between the opacities of 2 mm thick circular disks injection molded at 200° C., against a white and a black background. If the difference ΔE thus determined is small, this means that the samples are difficult to color.

The gloss was determined according to DIN67530 by a procedure in which light of a certain intensity was directed at the sample at an angle of incidence of 45° and the intensity of the reflected light was measured by means of a photogoniometer.

The solids contents of the emulsions denote the content of all solids fractions in percent by weight, based on the total mass of the respective emulsion.

I.1 Preparation of a small-particled novel graft copolymer (KP1)

1.1.1 Preparation of the grafting base (KP1.1)

A monomer mixture comprising 3.2 g of dihydrodicyclopentadienyl acrylate (DCPA) and 156.8 g of n-butyl acrylate in 1500 g of water was heated to 65° C. while stirring, with the addition of 10 g of the potassium salt of $C_{12}$- to $C_{18}$-paraffinsulfonic acid, 3 g of potassium peroxodisulfate, 3 g of sodium bicarbonate and 1.5 g of sodium pyrophosphate. 10 minutes after initiation of the polymerization reaction, a mixture of a further 16.8 g of DCPA and 823.2 g of n-butyl acrylate was metered in over 3 hours. After the end of the monomer addition, the emulsion was kept at 65° C. for a further hour.

The average particle size ($d_{50}$) was 80 nm.

I.1.2 Preparation of the grafting base (KP1.2)

2100 g of the emulsion prepared in I.1 were mixed with 1150 g of water and 2.7 g of potassium peroxodisulfate and heated to 65° C. while stirring. After the reaction temperature had been reached, 165 g of styrene were metered in over 1 hour, the average particle size ($d_{50}$) being 85 nm. After the end of the addition, a mixture of 372 g of styrene and 124 g of acrylonitrile was metered in. After the end of the addition, the emulsion was kept at 65° C. for a further 2 hours.

The average particle size ($d_{50}$) of the graft copolymer KP1 was 97 nm.

I.2 Preparation of the novel large-particled graft copolymer (GP1)

I.2.1 Preparation of the grafting base (GP1.1)

12.5 g of the grafting base described under I.1.1 were heated with 1500 g of water to 65° C. while stirring, with the addition of 3 g of potassium peroxodisulfate, 3 g of sodium bicarbonate and 1.5 g of sodium pyrophosphate. A mixture of 20 g of DCPA and 980 g of n-butyl acrylate and 3 g of the potassium salt of a $C_{12}$- to $C_{18}$-paraffinsulfonic acid was metered in over 3 hours. After the end of the monomer addition, the emulsion was kept at 65° C. for a further hour.

I.2.2 Preparation of the graft layer (GP1.2)

2100 g of the emulsion prepared in I.2.1 were mixed with 1150 g of water and 2.7 g of potassium peroxodisulfate and heated to 65° C. while stirring. After the reaction temperature had been reached, a monomer mixture comprising 165 g of styrene and 0.1 g of the potassium salt of a $C_{12}$- to $C_{18}$-paraffinsulfonic acid were metered in over 1 hour. After the end of the addition, a mixture of 372 g of styrene and 124 g of acrylonitrile was metered in. After the end of the addition, the emulsion was kept at 65° C. for a further 2 hours.

The average particle size ($d_{50}$) of the graft copolymers GP was 550 nm.

I.3 Preparation of the comparative graft copolymer (VP1)

I.3.1 Preparation of the grafting base (VP1.1)

The preparation of the grafting base corresponds to the process described under I.1.

I.3.2 Preparation of the graft layer (VP1.2)

2100 g of the emulsion prepared in 1.3.1 were mixed with 1150 g of water and 2.7 g of potassium peroxodisulfate and heated to 65° C. while stirring. After the reaction temperature had been reached, a monomer mixture comprising 495 g of styrene and 165 g of acrylonitrile was metered in over 3 hours. After the end of the addition, the emulsion was kept at 65° C. for a further 2 hours.

The graft copolymer VP1 had an average particle size of 95 nm.

II. Working up the graft copolymers

The graft copolymers were precipitated from the emulsion by means of a calcium chloride solution at 95° C., washed with water and dried in a warm stream of air.

III. Blending experiments

III.1 For the preparation of the blends 1 and 2 of Table 1, a styrene/acrylonitrile copolymer having an acrylonitrile content of 34% by weight and a viscosity number of 78 ml/g (the viscosity numbers were determined in a 0.5% strength solution in dimethylformamide (DMF) at 23° C.) was used as component iii. The precipitated and dried graft copolymers were mixed in an extruder at 260° C. with 70% by weight of component iii, 18% by weight of said graft copolymers being used as component i and 12% by weight as component ii.

III.2 For the preparation of the blends 3, 4 and 5 of Table 1, a styrene/acrylonitrile copolymer having an acrylonitrile content of 34% by weight and a viscosity number of 78 ml/g (the viscosity numbers were determined in a 0.5% strength solution in dimethylformamide (DMF) at 23° C.) was used as component iii. The precipitated and dried graft copolymers were mixed in an extruder at 260° C. with component iii so that the graft copolymer content was 50% by weight.

Shaped articles were produced from these blends at various temperatures and their performance characteristics were tested, as shown in Table 1.

TABLE 1

| Blend No. | 18/12 [% by weight] | $a_k$ (220/23) [kJ/m$^2$] (1) | $a_k$ (280/23) [kJ/m$^2$] | $a_n$ (220/−30) [kJ/m$^2$] (2) | $a_n$ (280/−30) [kJ/m$^2$] | ΔE | Gloss [%] |
|---|---|---|---|---|---|---|---|
| 1 (according to the invention) 527/95 | KP1/GP1 | 10.2 | 10.3 | 152 | 155 | 9.8 | 62 |
| 2 (according to the invention) | VP1/GP1 | 8.5 | 8.8 | 130 | 125 | 9.5 | 55 |
| 3 (according to the invention) 429/95 | KP1 | 27.1 | 28.0 | — | — | 7.2 | — |

TABLE 1-continued

| Blend No. | 18/12 [% by weight] | $a_k$ (220/23) [kJ/m$^2$] (1) | $a_k$ (280/23) [kJ/m$^2$] | $a_n$ (220/–30) [kJ/m$^2$] (2) | $a_n$ (280/–30) [kJ/m$^2$] | ΔE | Gloss [%] |
|---|---|---|---|---|---|---|---|
| 4 (comparison) | VP1 | 9.6 | 28.7 | — | — | 7.1 | — |
| 5 (according to the invention) | GP1 | 28.2 | 28.6 | — | — | 2.3 | — |

(1) The first number stated in brackets indicates the production temperature of the standard small bars, and the second number indicates the measuring temperature.
(2) The first number stated in brackets indicates the production temperature of the standard small bars, and the second number indicates the measuring temperature.

What is claimed is:

1. A graft copolymer (P1) having an average particle size ($d_{50}$) of from 40 to 2000 nm, containing at least P1.1) a soft segment from rubber elastic material having a glass transition temperature of not more than 0° C. and an average particle size ($d_{50}$) of no more than 150 nm as a grafting base, P1.2) a hard segment having a glass transition temperature of at least 11° C. as a graft layer, composed of P1.2.1) from 50 to 99.9% by weight of at least one vinylaromatic monomer, P1.2.2) from 0 to 20% by weight of at least one crosslinking agent and P1.2.3) from 0.1 to 50% by weight of at least one monomer copolymerizable with P1.2.1, which is not a vinylaromatic monomer, and that region of said graft layer P1.2 which is adjacent to the grafting base P1.1 consisting essentially of at least one vinylaromatic monomer P1.2.1 and the region facing away from the grafting base P1.1 consisting essentially of at least one vinylaromatic monomer P1.2.1 with at least one monomer P1.2.3. copolymerizable therewith (P1.2).

2. A graft copolymer P1 having an average/particle size ($d_{50}$) of from 40 to 2000 nm as defined in claim 1, comprising P1.1) from 30 to 95% by weight of a soft segment having a glass transition temperature of not more than 0° C. as the grafting base, comprising P1.1.1) from 50 to 99% by weight of at least one $C_1$- to $C_{18}$-acrylate, diene or dialkylsiloxane (P1.1.1), P1.1.2) from 0.1 to 50% by weight of at least one cross-linking agent (P1.1.2), P1.1.3) from 0 to 49.9% by weight of at least one monomer (P1.1.3) copolymerizable with P1.1.1, the sum of the percentages by weight of P1.1.1 to P1.1.3 being 100 and P1.2) from 5 to 70% by weight of a hard segment having a glass transition temperature of at least 25° C. being the grafting layer, comprising P1.2.1) from 50 to 99.9% by weight of at least one vinyl-aromatic monomer (P1.2. 1), P1.2.2) from 0 to 20% by weight of at least one cross-linking agent (P1.2.2) and P1.2.3) from 0.1 to 50% by weight of at least one monomer (P1.2.3) copolymerizable with P1.2.1, wherein the sum of the percentages by weight of P1.2.1 to P1.2.3 being 100, and wherein the region of the subsequent graft layer P1.2 which is adjacent to the grafting base comprising from 20 to 70% by weight of at least one vinyl-aromatic monomer P1.2.1 and the region facing away from the grafting base comprising from 30 to 80% by weight of at least one vinyl-aromatic monomer P1.2.1 with at least one monomer P1.2.3 copolymerizable therewith in a ratio of P1.2.1 to P1.2.3 of from 90:10 to 60:40, the sum of the weight percent of P1.2.1 and P1.2.2 with P1.2.3 being 100.

3. A graft copolymer (P2) having an average particle size ($d_{50}$) of from 40 to 2000 nm, containing P2.1) a soft segment from rubber elastic material having a glass transition temperature of not more than 0° C. and an average particle size ($d_{50}$) of no more than 150 nm as a grafing base, P2.2) a hard segment having a glass transition temperature of at least 11° C. as a graft layer, comprising P2.2.1) from 30 to 99.9% by weight of at least one vinyl-aromatic monomer (P2.2. 1), P2.2.2) from 0 to 20% by weight of at least one cross-linking agent (P2.2.2), and P2.2.3) from 0.1 to 70% by weight of at least one monomer (P1.2.3) copolymerizable with P2.2.1, wherein the sum of the weight percent of P2.2.1 to P2.2.3 being 100, and wherein the region of the subsequent graft layer P2.2, which is adjacent to the grafting base comprises from 10 to 50% by weight of at least one vinyl-aromatic monomer P2.2.1 and the region facing away from the grafting base comprises from 60 to 90% by weight of at least one vinyl-aromatic monomer P2.2.1 with at least one monomer P2.2.3 copolymerizable therewith in a ratio of P2.2.1 to P2.2.3 of from 90:10 to 60:40, the sum of the weight percent of P2.2.1 and P2.2.2 with P2.2.3 being 100, and a further graft layer P2.3 having a glass transition temperature of at least 10° C., which contains at least one vinyl-aromatic monomer as the monomer or as one of two or more monomers copolymerizable with one another.

4. A graft copolymer, P2, having an average particle size ($d_{50}$) of from 40 to 2000 nm, comprising P2.1) from 30 to 95% by weight of a soft segment having a glass transition temperature of not more than 0° C. as the grafting base, comprising P2.1.1) from 50 to 99% by weight of at least one $C_1$- to $C_{18}$-acrylate, diene or dialkylsiloxane (P2.1.1), P2.1.2) from 0.1 to 50% by weight of at least one cross-linking agent (P2.1.2), P2.1.3) from 0 to 49.9% by weight of at least one monomer (P2.1.3) copolymerizable with P2.1.1, the sum of the percentages by weight of P2.1.1 to P2.1.3 being 100, and P2.2) from 5 to 70% by weight of a hard segment having a glass transition temperature of at least 25° C. being the grafting layer, comprising, P2.2.1) from 30 to 99.9% by weight of at least one vinyl-aromatic monomer (P2.2.1), P2.2.2) from 0 to 20% by weight of at least one crosslinking agent (P2.2.2) and P2.2.3) from 0.1 to 70% by weight of at least one monomer (P2.2.3) copolymerizable with P2.2.1, the sum of the percentages by weight of P2.2.1 to P2.2.3 being 100, and wherein the region of the subsequent graft layer P2.2 which is adjacent to the grafting base comprises from 10 to 50% by weight of at least one vinyl-aromatic monomer P2.2.1 and the region facing away from the grafting base comprises from 60 to 90% by weight of at least one vinyl-aromatic monomer P2.2.1 with at least one monomer P2.2.3 copolymerizable therewith in a ratio of P2.2.1 to P2.2.3 of from 90:10 to 60:40, the sum of the weight percent of P2.2.1 and P2.2.2 with P2.2.2 being 100.

5. A graft copolymer P2 as defined in claim 3, containing

P2.1) from 30 to 90% by weight of a grafting base P2.1,

P2.2) from 5 to 50% by weight of a first graft layer P2.2 and

P2.3) from 5 to 50% by weight of a further graft layer having a glass transition temperature of at least 25° C. (P2.3), which contains P2.3.1) from 1 to 99% by weight of at least one vinyl-aromatic monomer (P2.3.1) and P2.3.2) from 1 to 99% by height of at least one monomer (P2.3.2) copolymerizable with P2.3.1, the sum of the percentages by weight of P2.1 to P2.3, and of P2.3.1 and P2.3.2, being 100 in each case.

6. A graft copolymer P2 as defined in claim 4, containing

P2.1) from 30 to 90% by weight of a grafting base P2.1,

P2.2) from 5 to 50% by weight of a first graft layer P2.2 and

P2.3) from 5 to 50% by weight of a further graft layer having a glass transition temperature of at least 25° C. (P2.3), which contains P2.3. 1) from 1 to 99% by weight of at least one vinyl-aromatic monomer (P2.3. 1) and P2.3.2) from 1 to 99% by weight of at least one monomer (P2.3.2) copolymerizable with P2.3.1, the sum of the percentages by weight of P2.1 to P2.3, and of P2.3.1 and P2.3.2, being 100 in each case.

7. A small-particle graft copolymer P1 as defined in claim 1 having an average particle size of from 40 to 200 nm.

8. A large-particle graft copolymer P1 as defined in claim 1 having an average particle size of from 250 to 2000 nm.

9. A small-particle graft copolymer P1 as defined in claim 2 having an average particle size of from 40 to 200 nm.

10. A large-particle graft copolymer P1 as defined in claim 2 having an average particle size of from 250 to 2000 nm.

11. A small-particle graft copolymer P2 as defined in claim 3 having an average particle size of from 40 to 200 nm.

12. A large-particle graft copolymer P2 as defined in claim 3 having an average particle size of from 250 to 2000 nm.

13. A small-particle graft copolymer P2 as defined in claim 4 having an average particle size of from 40 to 200 nm.

14. A large-particle graft copolymer P2 as defined in claim 4 having an average particle size of from 250 to 2000 nm.

15. A process for the preparation of a graft copolymer P1 as defined in claim 1, wherein the monomers and crosslinking agents forming the soft segment P1.1 and the hard segment P1.2 are polymerized in the presence of emulsifiers at from 20 to 100° C., the polymerization of the grafting base P1.1 being begun before that of the graft layer P1.2 and in the polymerization of the graft layer P1.2, the addition of at least one vinyl-aromatic monomer being begun before the addition of at least one vinyl-aromatic monomer with at least one monomer copolymerizable therewith.

16. A process for the preparation of a graft copolymer P2, wherein the monomers and crosslinking agents forming the soft segment P2.1 and the hard segments P2.2 and P2.3 are polymerized in the presence of emulsifiers at from 20 to 100° C., the polymerization of the grafting base P2.1 being begun before that of the graft layer P2.2, in the polymerization of the graft layer P2.2, the addition of at least one vinyl-aromatic monomer being begun before the addition of at least one vinyl-aromatic monomer with at least one monomer copolymerizable therewith and the polymerization of the graft layer P2.3 beginning after the start of the polymerization of the graft layer P2.2.

17. A process as defined in claim 15, wherein the graft layer P1.2 is prepared in at least two stages, from 20 to 70% by weight of P1.2.1 being used in the first stage and from 30 to 80% weight of a mixture of the monomers P1.2.1 and P1.2.2 in a weight ratio of from 90:10 to 60:40 being used in the second stage.

18. A process as defined in claim 16, wherein the graft layer P2.2 is prepared in at least two stages, from 20 to 70% by weight of P2.2.1 being used in the first stage and from 30 to 80% by weight of a mixture of the monomers P2.2.1 and P2.2.2 in a weight ratio of from 90:10 to 60:40 being used in the second stage.

19. A blend (Mk) comprising two or more graft copolymers containing at least one small-particle graft copolymer P1 or P2, as defined in claim 7 or 11 respectively.

20. A blend (M) comprising two or more graft copolymers containing at least one large-particle graft copolymer P1 or P2, as defined in claim 8 or 12 respectively.

21. A process for the preparation of a blend as defined in claim 19, wherein the graft copolymers contained in the blend are mixed with one another in an extruder at from 200 to 300° C. and in an average residence time of from 0.1 to 100 minutes.

22. A process for the preparation of a blend as defined in claim 20, wherein the graft copolymers contained in the blend are mixed with one another in an extruder at from 200 to 300° C. and in Can average residence time of from 0.1 to 100 minutes.

23. A thermoplastic material (T1) containing

T1.i) from 0.1 to 95% by weight of at least one of the graft copolymers P1 or P2 as defined in claims 1 or 3 respectively, T1.ii) from 0 to 94.9% by weight of at least one graft copolymer or blend differing from T1.i, T1.iii) from 5 to 99% by weight of at least one copolymer comprising T1.iii.1) from 50 to 100% by weight of at least one vinyl-aromatic monomer $C_1$- to $C_{18}$-alkyl acrylate, $C_1$- to $C_{18}$-alkyl methacrylate or a mixture thereof and T1.iii.2 from 0 to 50% by weight of acrylonitrile, methacrylonitrile, maleic anhydride, an N-substituted maleimide or a mixture there thereof, the sum of the percentages by weight of T1.iii.1 and T1.iii.2 being 100, T1.iv) from 0 to 90% by weight of at least one polycarbonate and T1.v) from 0 to 50% by weight of additives.

the sum of the percentages by weight of T1.i to T1.v being 100.

24. A molding, film, fiber or coating formed from at least one of the graft copolymers P1 defined in claim 1.

25. A molding, film, fiber or coating formed from at least one of the graft copolymers P2 defined in claim 3.

26. A molding, film, fiber or coating formed from a blend Mk as defined in claim 19.

27. A molding, film, fiber or coating formed from a blend Mg as defined in claim 20.

28. A molding, film, fiber or coating formed from a thermoplastic material TI as defined in claim 23.

* * * * *

UNITED STATES PATENT AND TRADEMARK OFFICE
CERTIFICATE OF CORRECTION

PATENT NO.: 6,066,693

DATED: May 23, 2000

INVENTOR(S): FISCHER et al.

It is certified that error appears in the above-identified patent and that said Letters Patent is hereby corrected as shown below:

Col. 21, claim 2, line 38, "average/particle" should be --average particle--.

Col. 24, claim 20, line 38, "(M)" should be --(Mg)--.

Col. 24, claim 22, line 50, "Can" should be --an--.

Signed and Sealed this

Third Day of April, 2001

Attest:

NICHOLAS P. GODICI

Attesting Officer

Acting Director of the United States Patent and Trademark Office